United States Patent
Yoshida et al.

(10) Patent No.: US 6,908,698 B2
(45) Date of Patent: Jun. 21, 2005

(54) COMPOSITE MATERIAL

(75) Inventors: Masaki Yoshida, Fujieda (JP); Masaki Kobayashi, Fujieda (JP); Hideyuki Kikuchi, Fujieda (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 10/383,638

(22) Filed: Mar. 10, 2003

(65) Prior Publication Data

US 2003/0215647 A1 Nov. 20, 2003

(30) Foreign Application Priority Data

Apr. 5, 2002 (JP) ........................................ 2002-104582

(51) Int. Cl.$^7$ ................................................. B32B 9/00
(52) U.S. Cl. ................. 428/697; 428/699; 428/701; 428/702; 428/446; 428/448; 428/428; 428/432; 428/409; 502/302; 502/349; 502/350
(58) Field of Search ............................... 428/697, 699, 428/701, 702, 446, 448, 428, 432, 409; 502/302, 349, 350

(56) References Cited

U.S. PATENT DOCUMENTS 6,054,227 A * 4/2000 Greenberg et al. .......... 428/701
6,154,311 A * 11/2000 Simmons et al. ............ 428/699
6,185,034 B1 * 2/2001 Nakamura et al. .......... 359/265
6,379,776 B1 * 4/2002 Tada et al. .................. 428/149

FOREIGN PATENT DOCUMENTS

| EP | 0 436 741 | 7/1991 |
| EP | 0 737 513 | 10/1996 |
| EP | 1 066 878 | 1/2001 |

* cited by examiner

*Primary Examiner*—Deborah Jones
*Assistant Examiner*—G. Blackwell-Rudasill
(74) *Attorney, Agent, or Firm*—Oblon, Spivak, McClelland, Maier & Neustadt, P.C.

(57) ABSTRACT

In a composite material having a construction that on the surface of a substrate is formed a primer layer having an appropriate function, and a photocatalyst layer is laminated on the primer layer, decreasing of the durability of the film due to the existence of the primer layer is prevented. Primer layer 14, photocatalyst layer 16, and hydrophilic layer 18 are laminated on one surface of transparent glass substrate 12 in this order. Primer layer 18, which makes up for suppressing sodium dispersion, is composed of a mixture or double oxide comprising an inorganic oxide such as $SiO_2$ and $Al_2O_3$, and lanthanoide oxide such as La, Ce, and Pr, or of $Ta_2O_5$ or $ZrO_2$. Photocatalyst layer 16 comprises, e.g., the photocatalyst, $TiO_2$. Hydrophilic layer 18 comprises, e.g., porous $SiO_2$.

22 Claims, 13 Drawing Sheets

COMPOSITE MATERIAL

FIELD OF THE INVENTION

The present invention relates to a composite material having a laminated structure that on the surface of a substrate material is formed a primer layer with an appropriate function and a photocatalyst layer formed on the primer layer. Due to the existence of the primer layer, the composite material of the present invention can prevent decreasing of the durability of the film.

DESCRIPTION OF THE RELATED ARTS

Conventionally techniques have been known in which a photocatalyst is coated on the surface of a substrate to decompose and remove dirt etc. adhered on the surface thereof or to make the surface hydrophilicity. For example, Japanese Patent Laid-Open No. 63-100042 discloses a technique in which a photocatalyst is coated on the surface of a substrate to decompose and remove dirt etc. adhered on the surface thereof. Also, Japanese Patent Laid-Open No. 10-36144 and Japanese Patent Laid-Open No. 2000-53449 disclose techniques in which a photocatalyst layer is formed on the surfaced of a substrate, and a porous inorganic oxide layer is further formed thereon as the outermost layer to obtain hydrophilicity possessed by the outermost porous inorganic oxide layer and to decompose and remove dirt adhered on the surface of the outermost porous inorganic oxide layer through the lower photocatalyst layer, whereby the hydrophilicity possessed by the outermost porous inorganic oxide layer is maintained. International Patent Publication WO96/29375 discloses a technique in which a photocatalyst layer is formed on the surface of a substrate whereby the hydrophilicity possessed by the photocatalyst itself is utilized to make the surface of the substrate hydrophilicity.

In such a type of technique, if photocatalyst is directly applied to a glass substrate, sodium ions contained in the glass substrate are sometimes dispersed into the photocatalyst layer, which would deteriorate the functions of the photocatalyst. For this reason, in order to suppress such a phenomenon, a layer for suppressing sodium dispersion such as a layer made of $SiO_2$ is sometimes formed between the glass substrate and the photocatalyst layer. Also, in the case where the photocatalyst technique is applied to a front surface mirror in which a reflecting layer is formed on the surface of the substrate, a layer for controlling a reflectance, such as a layer made of $SiO_2$ or $Al_2O_3$, is formed between the reflecting film and the photocatalyst layer for the purpose of controlling the reflectance characteristics.

However, if a layer for suppressing sodium dispersion or a layer for controlling reflectance is formed between the substrate and the photocatalyst layer, the adhesion force between such a film and the substrate becomes insufficient, leading to the problem associated with easy peeling of the films. The causes for resulting in insufficient adhesion force, which can be considered, include the generation of stress and distortion due to the crystallization of the photocatalyst layer, particularly the crystallization of titanium dioxide. As a method for solving the problem concerning the peeling of the films in the case where the layer for suppressing sodium dispersion is formed as the primer layer, Japanese Patent Laid-Open No. 11-228283 suggests that silica/alumina, silica/titania or silica/alumina/titania is incorporated in the primer layer. However, even if this method is applied, the film-peeling is sometimes brought about upon the exposure to hot water.

The present invention has been made in light of such situations, and an object of the present invention is to provide a composite material having much more improved durability in the case where the primer layer is formed.

SUMMARY OF THE INVENTION

The present invention is directed to a composite material having a construction that on the surface of a transparent or opaque substrate, composed of glass, synthetic resin or any other material, is formed a primer layer having an appropriate function, and a photocatalyst layer is laminated on the primer layer, said primer layer containing a lanthanoide oxide. According to the present invention, the incorporation of a lanthanoide oxide into the primer layer, the adhesion between the film and substrate and, what is more, film-peeling resistance, for example, the resistance at the time of exposing the composite material to hot water, can be improved. The primer layer may be composed of a material comprising a mixture of lanthanoide oxide with any other oxide or a double oxide composed of a lanthanoide oxide and any other oxide as a main ingredient. The lanthanoide oxide may comprise, for example, one or more of La, Ce, and Pr. The oxide other than the lanthanoide oxide may comprise an inorganic oxide such as $SiO_2$ and $Al_2O_3$.

The present invention is directed to a composite material having a construction that on the surface of a substrate is formed a primer layer having an appropriate function, and a photocatalyst layer is laminated on the primer layer, said primer layer being composed of a material comprising $Ta_2O_5$ as a main ingredient. According to this invention, the constitution of the primer layer utilizing a material comprising $Ta_2O_5$ as a main ingredient improves the adhesion force between the film and the substrate and, what is more, improves the film-peeling resistance, for example, the resistance at the time of exposing the composite material to hot water.

The present invention is further directed to a composite material having a construction that on the surface of a substrate is formed a primer layer having an appropriate function, and a photocatalyst layer is laminated on the primer layer, said primer layer being composed of a material comprising $ZrO_2$ as a main ingredient. According to this invention, the constitution of the primer layer utilizing a material comprising $ZrO_2$ as a main ingredient improves the adhesion force between the film and the substrate and, what is more, improves the film-peeling resistance, for example, the resistance at the time of exposing the composite material to hot water.

In the present invention, the photocatalyst layer may comprise, for example, the photocatalyst, $TiO_2$, as a main ingredient. Also, in the present invention, for example, a hydrophilic layer may be laminated onto the photocatalyst layer to be constituted as an anti-fog element. The hydrophilic layer may comprise, for example, porous $SiO_2$ as a main ingredient.

In the present invention, the substrate utilized is a glass substrate, and the primer substrate is directly formed on the surface of the glass substrate so that the primer layer may be constituted as a layer for suppressing sodium dispersion in which sodium ions contained in the glass substrate are prevented from being dispersed into the photocatalyst layer; or as a layer for controlling reflectance characteristics which controls the surface reflectance characteristics of the composite material In the composite material according to the present invention, the substrate may comprise a transparent material such as a transparent glass substrate to make the composite material transparent throughout the front surface and back surface. In the composite material according to the present invention, a reflecting film may be formed on the back surface of the transparent substrate to make up mirror. Alternatively, in the composite material according to the present invention, a reflecting film may be formed between the substrate and the primer layer to make up a mirror. In this case, the primer layer may be composed as a layer for controlling reflectance characteristics, which controls the surface reflectance characteristics of the composite material.

In the present invention, an EC element can be composed by placing a second substrate on the back surface side of the transparent substrate in an opposite manner, and incorporating a substance expressing an electrochromic phenomenon between these two substrates. In this case, when the second substrate comprises a transparent substrate, and a reflecting film is formed on the outer surface of the second substrate, an EC element may be composed. Alternatively, an electrode/reflecting film may be formed on the inner surface of the second substrate, which may or may not be opaque. In the present invention, the mirror, which has been composed can be utilized as a mirror body for automobile exterior mirror.

DESCRIPTION OF THE PREFERRED EMBODIMENTS

Figure 1:
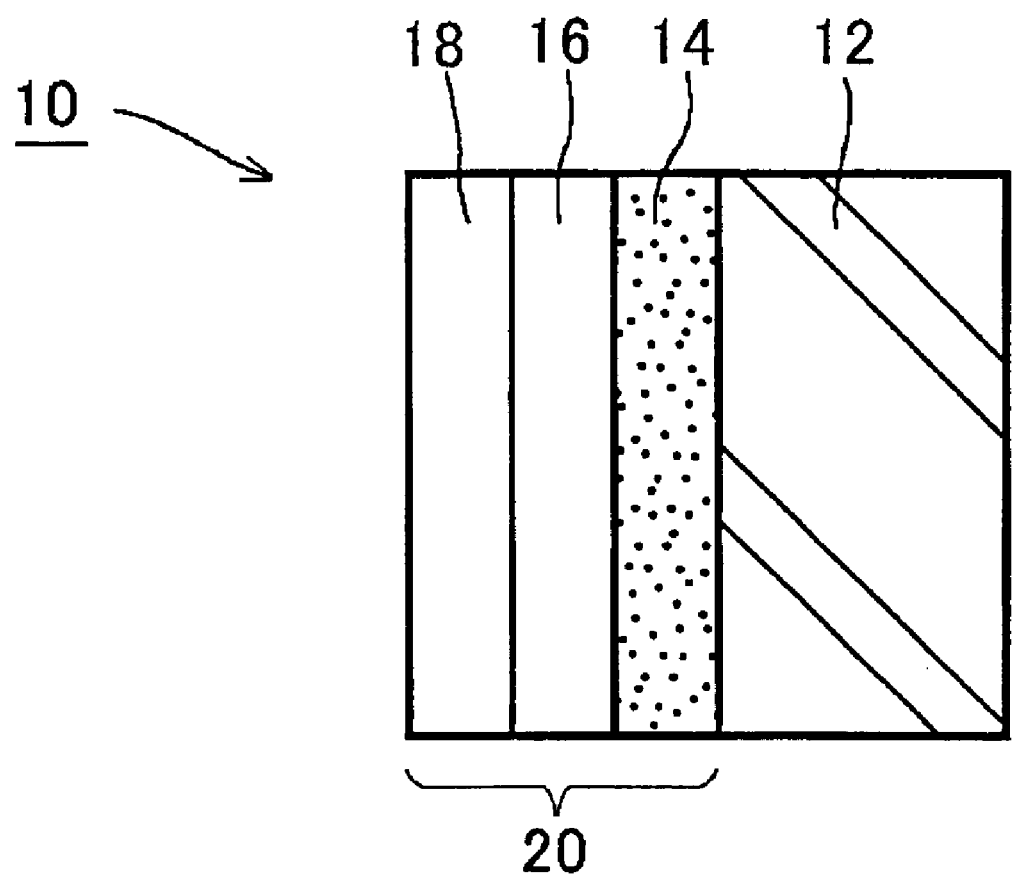
FIG. 1 is a schematic view showing an embodiment of the present invention.

Embodiments of the present invention will now be described. It should be noted that the cross sectional constructions of the composite materials are schematically represented, and the film thickness of each layer shown in these figures does not reflect the real thickness. One embodiment of the present invention is shown in a cross sectional view of FIG. 1. Composite material 10 is composed of a transparent glass substrate 12 having primer layer 14, photocatalyst layer 16, and hydrophilic layer 18 laminated on one side of transparent glass substrate 12 by a PVD method, such as vacuum deposition or sputtering; or any other film formation method in this order. Throughout the front to the rear surface, composite material 10 is constituted as a transparent anti-fog element. Primer layer 14 makes up, for example, both or either of a layer for suppressing sodium dispersion and a layer for controlling reflectance characteristics, it comprises a mixture of an inorganic oxide such as $SiO_2$ and $Al_2O_3$, with an oxide of lanthanoide such as La, Ce, and Pr; a double oxide of these oxides; $Ta_2O_5$; or $ZrO_2$, and the adhesion force (junction property) of the film relative to glass substrate 12 is improved. Photocatalyst layer 16 comprises, for example, the photocatalyst, $TiO_2$. Hydrophilic layer 18 comprises, for example, porous $SiO_2$.

According to composite material 10 shown in FIG. 1, hydrophilicity can be obtained from hydrophilic layer 18, which is the outermost layer of laminated film 20, and the dirt or such adhered on the surface of hydrophilic layer 18 is decomposed and removed through the photocatalytic function of the light excited photocatalyst layer 16, whereby hydrophilicity of hydrophilic layer 18 can be maintained. Furthermore, primer layer 14 can prevent sodium ions contained in glass substrate 12 from being dispersed into photocatalyst layer 16 to decrease the photocatalytic functions. When a material having an index of refraction between that of glass substrate 12 and that of photocatalyst layer 16 is used to make up primer layer 14, primer layer 14 serves as a layer for controlling reflection characteristics and thus, can play a role in decreasing the surface refraction.

For example, composite material 10 having a construction as shown in FIG. 1 can be utilized as window glass for automobile or construction, lens for glasses (spectacles), lens for camera, a filter for camera and the like. In any case, hydrophilicity and soil releasing property can be obtained. In the case of window glass for automobile or construction, lens for glasses (spectacles), and lens for camera, films 20 for lamination can be formed on both surfaces of glass substrate as occasion demands.

Figure 2:
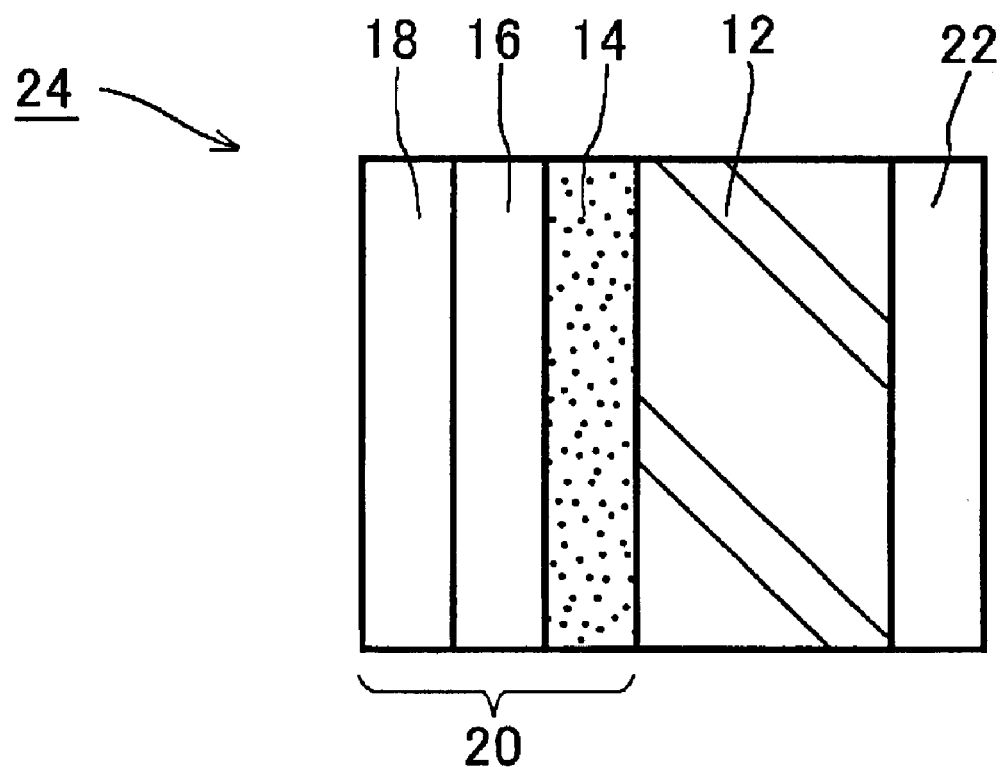
FIG. 2 is a schematic view showing another embodiment of the present invention.

Also, when composite material 10 having a construction as shown in FIG. 1 is used and reflecting film 22, for example, made of Al, Cr, etc., is formed on the back surface of glass substrate 12 as shown in FIG. 2, mirror 24 (back surface mirror) can be composed, which can be used as a mirror body for automobile exterior mirror, bathroom mirror or any other mirror. In any case, the resulting mirror can exhibit hydrophilicity and soil releasing property as anti-fog mirror.

In the constructions shown in FIGS. 1 and 2, any other layer(s) may optionally be formed between glass substrate 12 and primer layer 14, between primer layer 14 and photocatalyst layer 16, and/or between photocatalyst layer 16 and hydrophilic layer 18.

Figure 3:
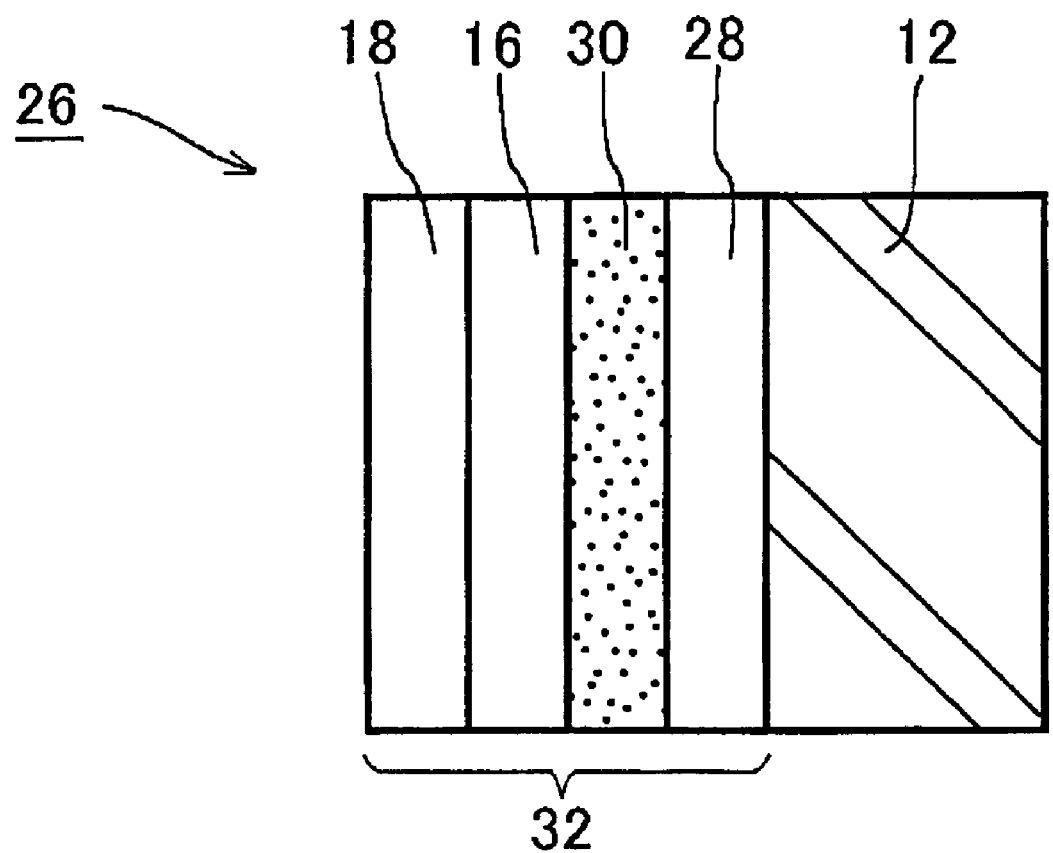
FIG. 3 is a schematic view showing still another embodiment of the present invention.

Another embodiment of the present invention will be shown in FIG. 3. In this figure, the parts common to FIGS. 1 and 2 represent the same numbers or symbols. Composite material 26 in this embodiment makes up a surface mirror and is composed of transparent or opaque glass substrate 12 having reflecting film 28, primer layer 30, photocatalyst layer 16, and hydrophilic layer 18 laminated on one side of transparent glass substrate 12 by a PVD method such as vacuum deposition or sputtering; or any other film formation method in this order. Reflecting film 28 is made of Al, Cr, or any other material. Primer layer 30 serves as a layer for controlling reflectance characteristics and may be composed of a material comprising a mixture of inorganic oxide such as $SiO_2$ and $Al_2O_3$, with an oxide of lanthanoide such as La, Ce, and Pr; a double oxide composed of the lanthanoide oxide just mentioned and the inorganic oxide just mentioned, or $Ta_2O_5$ or $ZrO_2$ to thereby improve the adhesion force (junction property) of the film relative to glass substrate 12. Photocatalyst layer 16 comprises, for example, the photocatalyst, $TiO_2$. Hydrophilic layer 18 comprises, for example, porous $SiO_2$.

According to composite material 26 as shown in FIG. 3, hydrophilicity can be obtained from hydrophilic layer 18, which is the outermost layer of laminated film 32, and the dirt or such adhered on the surface of hydrophilic layer 18 is decomposed and removed through the photocatalytic function of the light excited photocatalyst layer 16, whereby hydrophilicity of hydrophilic layer 18 can be maintained. Furthermore, primer layer 30 controls spectral reflectance characteristics of catoptric light.

Composite material 26 as shown in FIG. 3 can be used, for example, as a mirror body for automobile exterior mirror, bathroom mirror, or any other mirror. In any case, the resulting mirror can exhibit hydrophilicity and soil releasing property as anti-fog mirror. In the case of the automobile exterior mirror, a material for primer layer 30 and thickness of primer layer 30 are suitably selected to make a color of reflected light blue utilizing light interference. This can produce blue mirror.

In the construction shown in FIG. 3, any other layer(s) may optionally be formed between reflecting layer 28 and primer layer 30, between primer layer 30 and photocatalyst layer 16, and/or between photocatalyst layer 16 and hydrophilic layer 18.

EXAMPLE

Example 1

Example of Composite Material 10 Shown in FIG. 1: Containing Lanthanoide Oxide in Primer Layer Onto glass substrate 12 having been heated to 100° C., a 30 nm thick film of a double oxide comprising $La_2O_3$ and $Al_2O_3$ or a mixture of $La_2O_3$ with $Al_2O_3$ ($La_2O_3/Al_2O_3$ weight ratio=50/50) as primer layer 14 making up a layer for suppressing sodium dispersion, a 200 nm thick film of $TiO_2$ as photocatalyst layer 16 in the state of not serving as photocatalyst, and a 20 nm thick film of $SiO_2$ as hydrophilic layer 18 were formed by a vacuum deposition method in this order. Thereafter, the laminated film was thermally treated at 500° C. to impart photocatalyst layer 16 to photocatalytic functions. Since primer layer 14 making up a layer for suppressing sodium dispersion is placed between glass substrate 12 and photocatalyst layer 16, dispersion of sodium ions contained in glass substrate 12 during the course of this thermal treatment can be prevented.

Example 2

Example of Composite Material 10 Shown in FIG. 1: Changing Proportion of Double Oxide or Mixture in Example 1

Onto glass substrate 12 having been heated to 100° C., a 30 nm thick film of a double oxide comprising $La_2O_3$ and $Al_2O_3$ or a mixture of $La_2O_3$ with $Al_2O_3$ ($La_2O_3/Al_2O_3$ weight ratio=80/20) as primer layer 14 making up a layer for suppressing sodium dispersion, a 200 nm thick film of $TiO_2$ as photocatalyst layer 16 in the state of not serving as photocatalyst, and a 20 nm thick film of $SiO_2$ as hydrophilic layer 18 were formed by a vacuum deposition method in this order. Thereafter, the laminated film was thermally treated at 500° C. to impart photocatalyst layer 16 to photocatalytic functions. Since primer layer 14 making up a layer for suppressing sodium dispersion is placed between glass substrate 12 and photocatalyst layer 16, dispersion of sodium ions contained in glass substrate 12 during the course of this thermal treatment can be prevented.

Example 3

Example of Composite Material 10 Shown in FIG. 1: Changing Lanthanoide in Example 1

Onto glass substrate 12 having been heated to 100° C., a 30 nm thick film of a double oxide comprising $Pr_2O_3$ and $Al_2O_3$ or a mixture of $Pr_2O_3$ with $Al_2O_3$ ($Pr_2O_3/Al_2O_3$ weight ratio=50/50) as primer layer 14 making up a layer for suppressing sodium dispersion, a 200 nm thick film of $TiO_2$ as photocatalyst layer 16 in the state of not serving as photocatalyst, and a 20 nm thick film of $SiO_2$ as hydrophilic layer 18 were formed by a vacuum deposition method in this order. Thereafter, the laminated film was thermally treated at 500° C. to impart photocatalyst layer 16 to photocatalytic functions. Since primer layer 14 making up a layer for suppressing sodium dispersion is placed between glass substrate 12 and photocatalyst layer 16, dispersion of sodium ions contained in glass substrate 12 during the course of this thermal treatment can be prevented.

Example 4

Example of Composite Material 10 Shown in FIG. 1: Changing Oxide in Example 1

Onto glass substrate 12 having been heated to 100° C., a 30 nm thick film of a double oxide comprising $La_2O_3$ and $SiO_2$ or a mixture of $La_2O_3$ with $SiO_2$ ($La_2O_3/SiO_2$ weight ratio=50/50) as primer layer 14 making up a layer for suppressing sodium dispersion, a 200 nm thick film of $TiO_2$ as photocatalyst layer 16 in the state of not serving as photocatalyst, and a 20 nm thick film of $SiO_2$ as hydrophilic layer 18 were formed by a vacuum deposition method in this order. Thereafter, the laminated film was thermally treated at 500° C. to impart photocatalyst layer 16 to photocatalytic functions. Since primer layer 14 making up a layer for suppressing sodium dispersion is placed between glass substrate 12 and photocatalyst layer 16, dispersion of sodium ions contained in glass substrate 12 during the course of this thermal treatment can be prevented.

Example 5

Example of Composite Material 10 Shown in FIG. 1: Changing Lanthanoide and Oxide in Example 1

Onto glass substrate 12 having been heated to 100° C., a 30 nm thick film of a double oxide comprising $CeO_2$ and $SiO_2$ or a mixture of $CeO_2$ with $SiO_2$ ($CeO_2/SiO_2$ weight ratio=50/50) as primer layer 14 making up a layer for suppressing sodium dispersion, a 200 nm thick film of $TiO_2$ as photocatalyst layer 16 in the state of not serving as photocatalyst, and a 20 nm thick film of $SiO_2$ as hydrophilic layer 18 were formed by a vacuum deposition method in this order. Thereafter, the laminated film was thermally treated at 500° C. to impart photocatalyst layer 16 to photocatalytic functions. Since primer layer 14 making up a layer for suppressing sodium dispersion is placed between glass substrate 12 and photocatalyst layer 16, dispersion of sodium ions contained in glass substrate 12 during the course of this thermal treatment can be prevented.

Example 6

Example of Composite Material 26 Shown in FIG. 3: Containing Lanthanoide Oxide in Primer Layer A film of Cr having a thickness of 100 nm or more was formed on the surface of glass substrate 12 by a sputtering method, after which glass substrate 12 was heated to 200° C. and a 10 nm thick film of a double oxide comprising $La_2O_3$ and $Al_2O_3$ or a mixture of $La_2O_3$ with $Al_2O_3$ ($La_2O_3/Al_2O_3$ weight ratio=50/50) as primer layer 30 making up a layer for controlling reflectance characteristics, a 65 nm thick film of $TiO_2$ as photocatalyst layer 16, and a 10 nm thick film of $SiO_2$ as hydrophilic layer 18 were formed by a vacuum deposition method in this order. Since photocatalyst layer 16 is formed in the state where the temperature of the substrate is high, the photocatalytic functions have already been imparted to photocatalyst layer 16 at the time of film formation; thus, no thermal treatment at 500° C. is carried out.

Example 7

Example of Composite Material 10 Shown in FIG. 1: Primer Layer Composed of $Ta_2O_5$ Onto glass substrate 12 having been heated to 100° C., a 70 nm thick film of $Ta_2O_5$ as primer layer 14 making up a layer for suppressing sodium dispersion, a 200 nm thick film of $TiO_2$ as photocatalyst layer 16 in the state of not serving as photocatalyst, and a 20 nm thick film of $SiO_2$ as hydrophilic layer 18 were formed by a vacuum deposition method in this order. Thereafter, the laminated film was thermally treated at 500° C. to impart photocatalyst layer 16 to photocatalytic functions. Since primer layer 14 making up a layer for suppressing sodium dispersion is placed between glass substrate 12 and photocatalyst layer 16, dispersion of sodium ions contained in glass substrate 12 during the course of this thermal treatment can be prevented.

Example 8

Example of Composite Material 10 Shown in FIG. 1: Primer Layer Composed of $ZrO_2$ Onto glass substrate 12 having been heated to 100° C., a 70 nm thick film of $ZrO_2$ as primer layer 14 making up a layer for suppressing sodium dispersion, a 200 nm thick film of $TiO_2$ as photocatalyst layer 16 in the state of not serving as photocatalyst, and a 20 nm thick film of $SiO_2$ as hydrophilic layer 18 were formed by a vacuum deposition method in this order. Thereafter, the laminated film was thermally treated at 500° C. to impart photocatalyst layer 16 to photocatalytic functions. Since primer layer 14 making up a layer for suppressing sodium dispersion is placed between glass substrate 12 and photocatalyst layer 16, dispersion of sodium ions contained in glass substrate 12 during the course of this thermal treatment can be prevented.

Example 9

Example of Composite Material 26 Shown in FIG. 3: Primer Layer Composed of $Ta_2O_5$ A film of Cr having a thickness of 100 nm or more was formed on the surface of glass substrate 12 by a sputtering method, after which glass substrate was heated to 200° C. and a 10 nm thick film of $Ta_2O_5$ as primer layer 30 making up a layer for controlling reflectance characteristics, a 65 nm thick film of $TiO_2$ as photocatalyst layer 16, and a 10 nm thick film of $SiO_2$ as hydrophilic layer 18 were formed by a vacuum deposition method in this order. Since photocatalyst layer 16 is formed in the state where the temperature of the substrate is high, the photocatalytic functions have already been imparted to photocatalyst layer 16 at the time of film formation; thus, no thermal treatment at 500° C. is carried out.

Comparative Example 1

No Primer Layer in Construction of FIG. 1

In order to examine the performance of the layer for suppressing sodium dispersion, in Comparative Example 1, onto glass substrate 12 having been heated to 100° C., a 200 nm thick film of $TiO_2$ as photocatalyst layer 16 in the state of not serving as photocatalyst, and a 20 nm thick film of $SiO_2$ as hydrophilic layer 18 were formed by a vacuum deposition method in this order. Thereafter, the laminated film was thermally treated at 500° C. to impart photocatalyst layer 16 to photocatalytic functions.

Comparative Example 2

Primer Layer Composed of $SiO_2$ in Construction of FIG. 1

In order to examine peeling resistance of the construction of FIG. 1, in Comparative Example 2, onto glass substrate 12 having been heated to 100° C., a 30 nm thick film of $SiO_2$ (containing no lanthanoide) as primer layer 14 making up a layer for suppressing sodium dispersion, a 200 nm thick film of $TiO_2$ as photocatalyst layer 16 in the state of not serving as photocatalyst, and a 20 nm thick film of $SiO_2$ as hydrophilic layer 18 were formed by a vacuum deposition method in this order. Thereafter, the laminated film was thermally treated at 500° C. to impart photocatalyst layer 16 to photocatalytic functions.

Comparative Example 3

Primer Layer Composed of $Al_2O_3$ in Construction of FIG. 3

In order to examine peeling resistance of the construction of FIG. 1, in Comparative Example 3, a film of Cr having a thickness of 100 nm or more was formed on the surface of glass substrate 12 by a sputtering method, after which glass substrate 12 was heated to 200° C. and a 10 nm thick film of a $Al_2O_3$ (containing no lanthanoide) as primer layer 30 making up a layer for controlling reflectance characteristics, a 75 nm thick film of $TiO_2$ as photocatalyst layer 16, and a 10 nm thick film of $SiO_2$ as hydrophilic layer 18 were formed by a vacuum deposition method in this order.

The samples of Examples 1 to 9 and Comparative Examples 1 to 3 were produced as described above, and the performances of each sample were evaluated according to the following methods:

(a) Photocatalytic Performance:

Oil was dropped onto hydrophilic layer 18 of each sample to heighten the contact angle of water-droplet, and ultraviolet rays were irradiated to examine change in the contact angle of water-droplet. A sample in which the contact angle of water-droplet became not more than 5° was rated as circle "○", and a sample in which the contact angle of water-droplet was maintained at a high contact angle exceeding 5° was rated as cross "X".

(b) Resistance to Hot Water:

Each sample was incorporated into boiling water for a constant period of time, and the change in the adhesion force of the film (presence or absence of film-peeling) was examined. A sample showing no film-peeling was rated as circle "○", and a sample showing film-peeling was rated as cross "X".

The results of evaluating the performances of the samples of Examples 1 to 9 are shown in Table 1.

TABLE 1

| | Example | | | | | | | | |
|---|---|---|---|---|---|---|---|---|---|
| | 1 | 2 | 3 | 4 | 5 | 6 | 7 | 8 | 9 |
| Photocatalytic Performance | ○ | ○ | ○ | ○ | ○ | ○ | ○ | ○ | ○ |
| Resistance to Hot Water (5 hrs.) | ○ | ○ | ○ | ○ | ○ | ○ | ○ | ○ | ○ |
| Resistance to Hot Water (10 hrs.) | ○ | ○ | ○ | ○ | ○ | ○ | ○ | ○ | ○ |

The results of evaluating the performance of the samples of Comparative Examples 1 to 3 are shown in Table 2.

TABLE 2

| | Comparative Example | | |
|---|---|---|---|
| | 1 | 2 | 3 |
| Photocatalytic Performance | X | ○ | ○ |
| Resistance to Hot Water (5 hrs.) | ○ | X | ○ |
| Resistance to Hot Water (10 hrs.) | X | X | X |

According to the results of performance evaluation of Tables 1 and 2, the followings can be mentioned. In Comparative Example 1 where any primer layer (which is the layer for suppressing sodium dispersion) is absence, no sufficient photocatalytic performance can be obtained. In contrast, in Examples 1 to 9, sufficient photocatalytic performance can be obtained. In Comparative Examples 1 to 3 where the primer contains no lanthanoide or is not composed of $Ta_2O_5$ or $ZrO_2$, no sufficient resistance to hot water can be obtained, whereas in all of Examples 1 to 9, sufficient resistance to hot water can be obtained.

Figure 4:
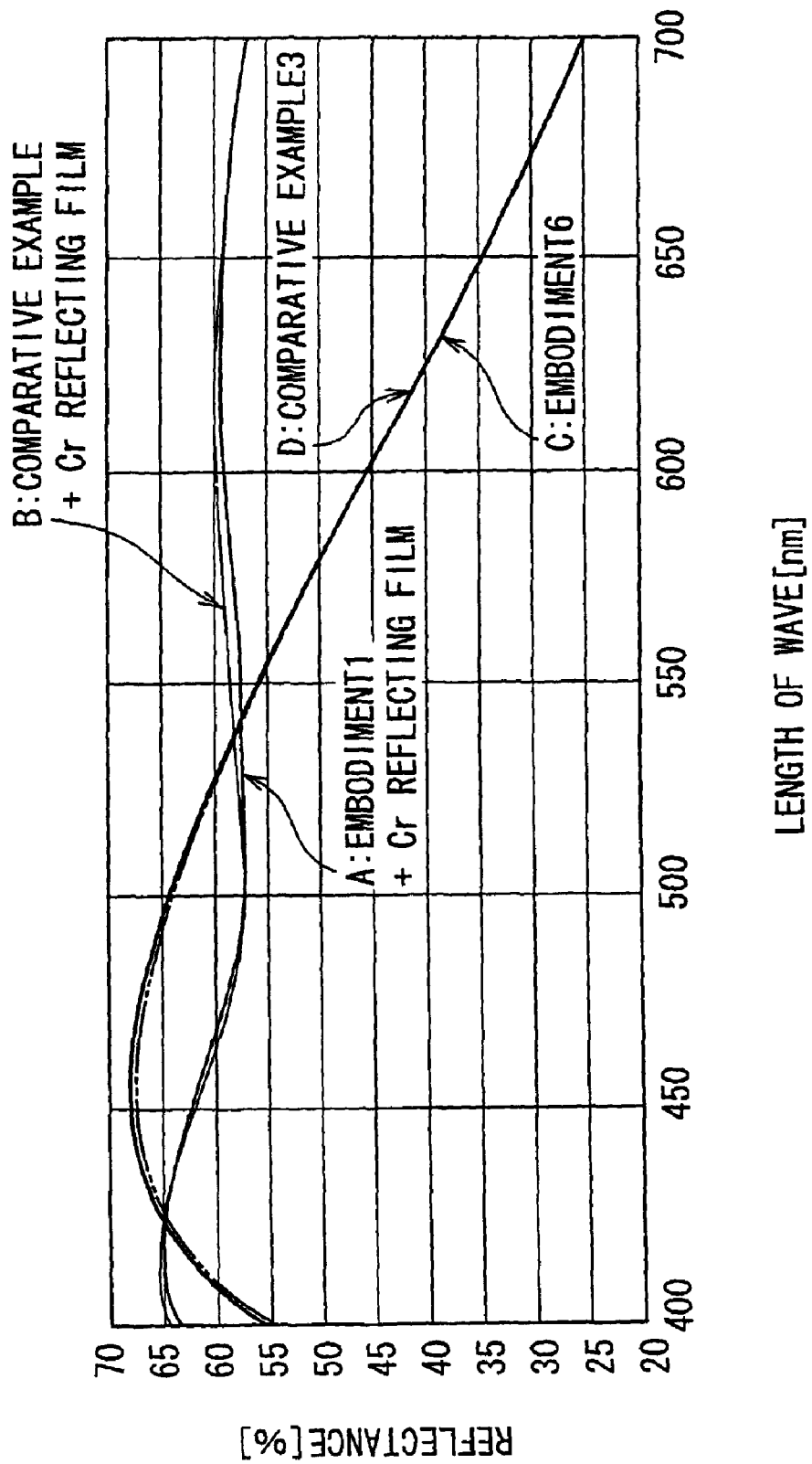
FIG. 4 is a graph showing spectrometric reflectance of Example and Comparative Example of the present invention.

FIG. 4 is a graph showing spectrometric reflectance of Example and Comparative Example. Characteristics A indicate characteristics of mirror in which Cr reflecting film is formed on the back surface of the structure of Example 1. According to characteristics A, it has been proven that only by providing a film of a double oxide comprising $La_2O_3$ and $Al_2O_3$ or a mixture of $La_2O_3$ with $Al_2O_3$ ($La_2O_3/Al_2O_3$ weight ratio=50/50) having a thickness of 30 nm as primer layer 14 making up a layer for suppressing sodium dispersion, the spectrometric reflectance in the case where no primer layer 14 is provided can be substantially maintained.

In FIG. 4, characteristics C present those of Example 6, and characteristics D represent those of Comparative Example 3. According to these characteristics, it can be understood that only by incorporating lanthanoide oxide, $La_2O_3$, into primer layer 30 making up the layer for controlling reflectance characteristics, the spectrometric reflectance in the case where no lanthanoide oxide, $La_2O_3$, is contained can be substantially maintained.

In the foregoing embodiments, while only one lanthanoide oxide is incorporated into the primer layer, it should be noted that a plurality kinds of lanthanoide oxides might be incorporated into the primer layer.

OTHER EMBODIMENTS

Figure 5:
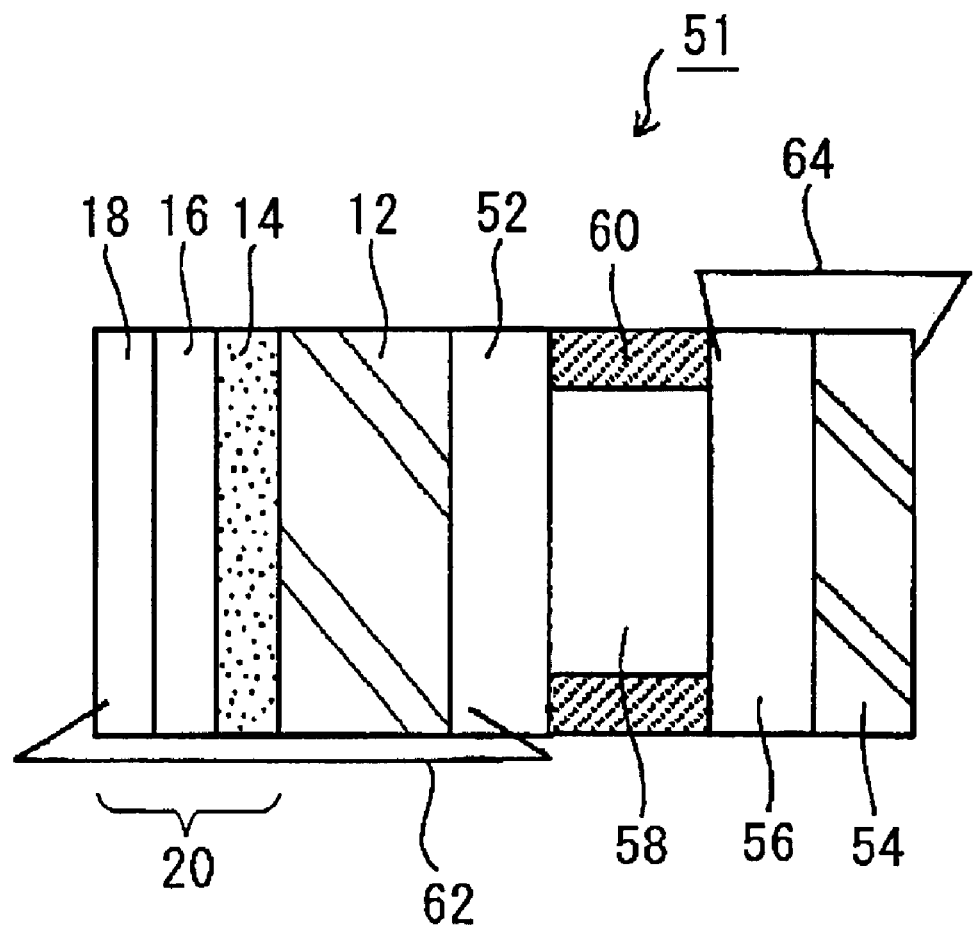
FIG. 5 is a schematic cross-sectional view showing an embodiment of a mirror body of automobile EC exterior mirror utilizing a construction shown in FIG. 1.

FIG. 5 shows an embodiment of a mirror body for an automobile EC exterior mirror (anti-glare mirror) utilizing the composite material according to the present invention. Parts common to FIG. 1 represent the same numbers or symbols. Mirror body 32 for automobile exterior mirror according to this embodiment is composed of transparent substrate 12 comprising glass, and transparent laminated film 20 formed on one surface of transparent substrate 12. Laminated film 20 is composed of primer layer 14, photocatalyst layer 16 and hydrophilic layer 18 by a PVD method such as vacuum deposition or sputtering or any other film formation method in this order. Primer layer 14 makes up, for example, both or either of a layer for suppressing sodium dispersion and a layer for controlling reflectance characteristics, and it comprises a mixture of an inorganic oxide such as $SiO_2$ and $Al_2O_3$, with an oxide of lanthanoide such as La, Ce, and Pr, double oxide of these oxides, or $Ta_2O_5$ or $ZrO_2$ to thereby improve the adhesion force (junction property) of the film relative to glass substrate 12. Photocatalyst layer 16 comprises, for example, the photocatalyst, $TiO_2$. Hydrophilic layer 18 comprises, for example, porous $SiO_2$.

Onto the back surface of glass substrate 12, transparent electrode film 34, for example, made of ITO, EC layer 35 (lamination of oxidation coloring layer 36, for example, made of $IrO_x$; solid electrode layer 38, for example, $Ta_2O_5$; and reduction coloring layer 40, for example, made of $WO_3$), and electrode/reflecting film 42, for example, made of Al or Cr in this order. These films 34, 35, and 42, making up the lamination, are sealed by sealing agent 44 such as epoxy and another glass substrate (sealing glass). To both edges of glass substrate 12 are fit clip electrodes 48 and 50, respectively. Clip electrode 48 is electrically connected to transparent electrode film 34, and clip electrode 50 is electrically connected to electrode/reflecting film 42. By applying a coloring voltage between clip electrodes 48 and 50, EC layer 35 is colored (anti-glare state). By applying a discoloring voltage between clip electrodes 48 and 50 or by shorting the circuit between these electrodes, EC layer 35 is discolored (non-anti-glare state).

Figure 6:
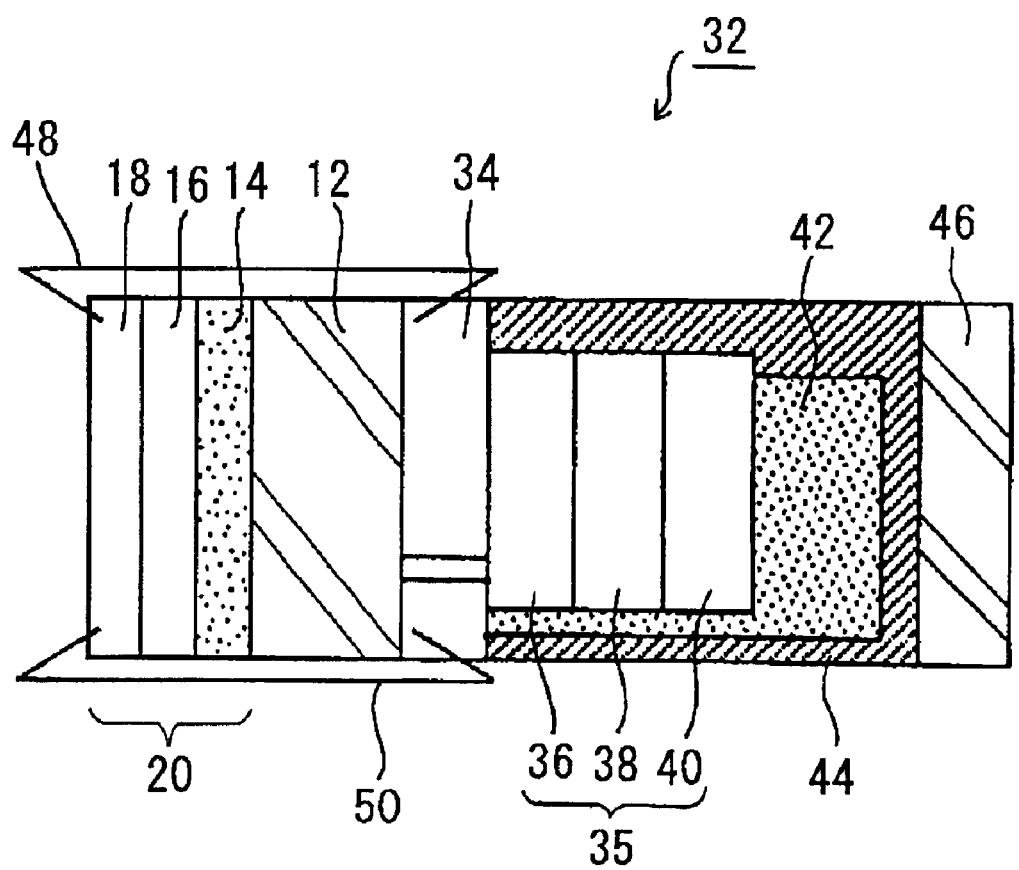
FIG. 6 is a schematic cross-sectional view showing another embodiment of a mirror body of automobile EC exterior mirror utilizing the construction shown in FIG. 1.

Another embodiment of a mirror body for automobile EC exterior mirror using the composite material according to the present invention is shown in FIG. 6. The parts common to FIG. 1 represent the same numbers or symbols. Mirror body 51 of this EC exterior mirror comprises transparent glass substrate 12, and transparent electrode film 52, for example, made of ITO, formed on the back surface of transparent glass substrate 12. Onto the inner circumference of substrate 54, which is place opposite transparent glass substrate 12 and which may be opaque, for example, made of glass, electrode/reflecting film 56, for example, made of Al or Cr, is formed. An EC solution for making up EC layer 58 (for example, a mixed solution comprising an EC substance such as viologen, a solvent such as γ-butyrolactone and propylene carbonate, and an ultraviolet absorbing agent such as benzophenone and cyanoacrylate) is incorporated between transparent glass substrate 12 and substrate 54. EC layer 58 is sealed by sealing agent 60. Clip electrode 62 is fit to a lower edge of transparent glass substrate 12 and is electrically connected to transparent electrode film 52. Clip electrode 64 is fit to an upper edge of substrate 54 and is electrically connected to electrode/reflecting film 56. By applying a coloring voltage between clip electrodes 62 and 64, EC layer 58 is colored (anti-glare state). By applying a discoloring voltage between clip electrodes 62 and 64 or by shorting the circuit between these electrodes, EC layer 58 is discolored (non-anti-glare state).

Figure 7:
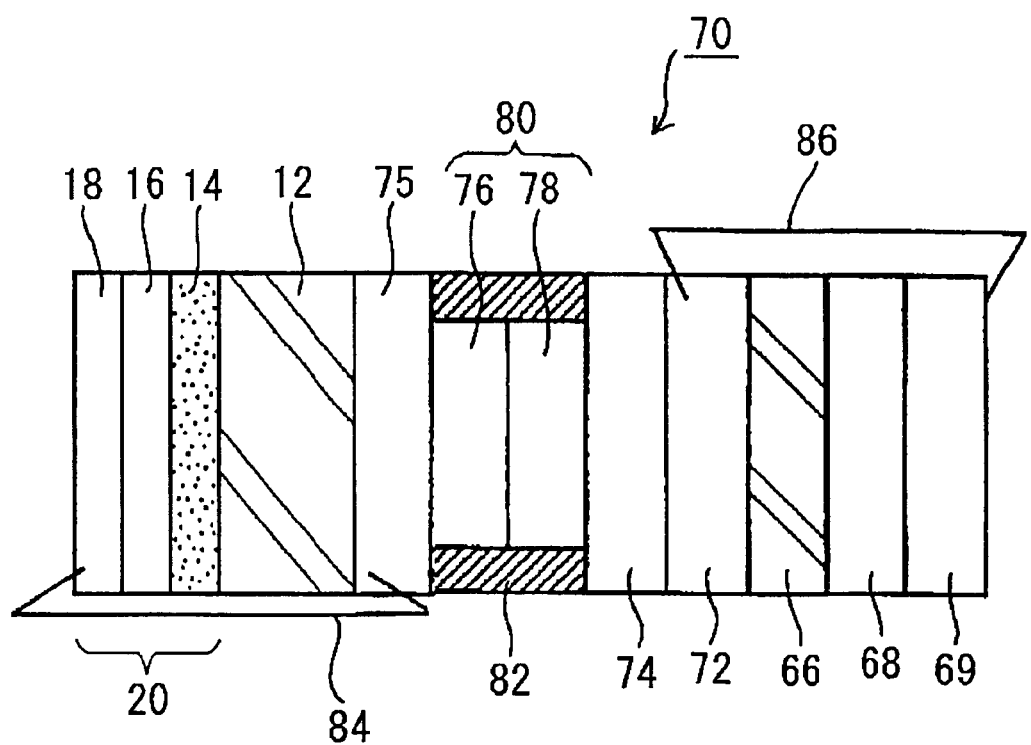
FIG. 7 is a schematic cross-sectional view showing still another embodiment of a mirror body of automobile EC exterior mirror utilizing the construction shown in FIG. 1.
Figure 8:
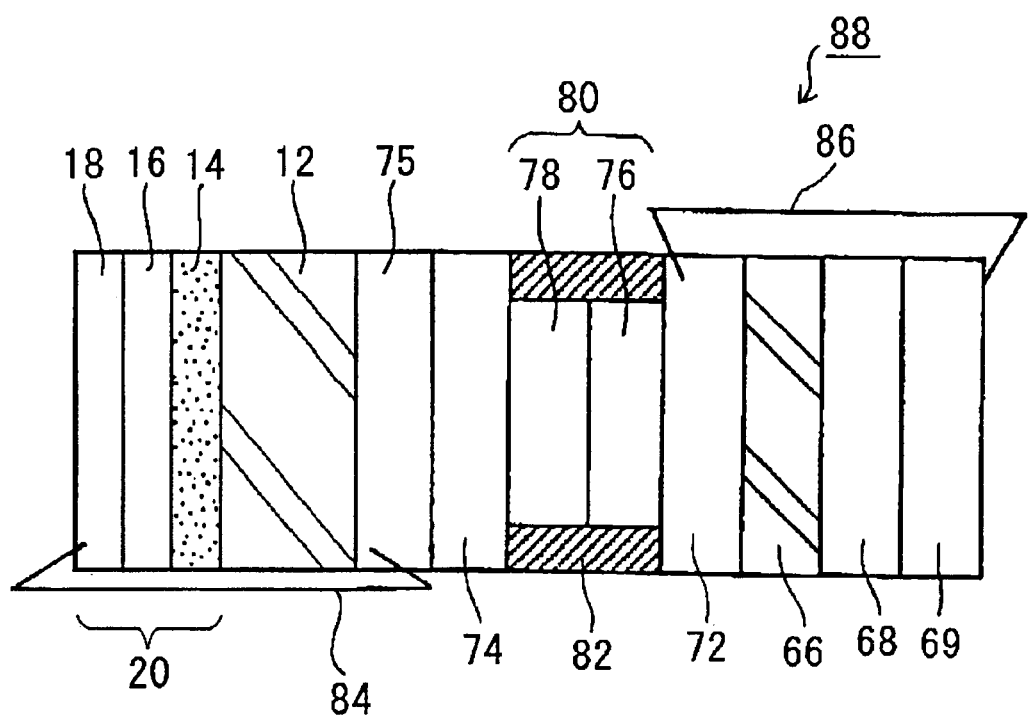
FIG. 8 is a schematic cross-sectional view showing still another embodiment of a mirror body of automobile EC exterior mirror utilizing the construction shown in FIG. 1.
Figure 9:
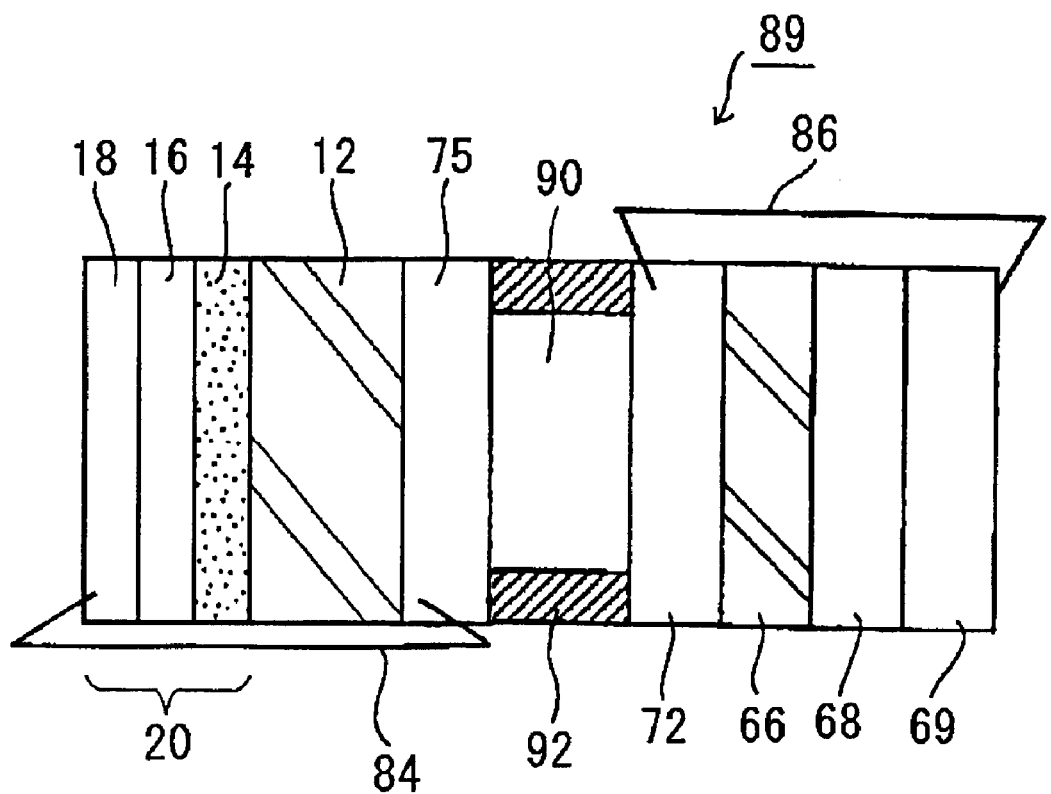
FIG. 9 is a schematic cross-sectional view showing still another embodiment of a mirror body of automobile EC exterior mirror utilizing the construction shown in FIG. 1.

Still another embodiments of mirror bodies for automobile EC exterior mirror using the composite material according to the present invention are shown in FIGS. 7 to 9, respectively. The parts common to FIG. 1 represent the same numbers or symbols. Each of these mirror bodies is composed of reflecting film 68, for example, made of Al or Cr, formed on the back surface of transparent glass substrate 66. Protective coating 69 is coated on the back surface of reflecting film 68 (provided that protective coating 69 is not required if reflecting film 68 does not undergo corrosion). In mirror body 70 for automobile EC exterior mirror as shown in FIG. 7, transparent electrode film 72 and electrode protection layer 74, for example, made of $SiO_2$, are formed on the front surface of transparent glass substrate 66, and transparent electrode film 75 and film 76 comprising an EC substance such as $WO_3$, $MoO_3$ and $IrO_x$ are formed on the back surface of transparent glass substrate 12. Electrolyte solution 78 (for example, a mixed solution comprising an electrolyte such as LiI and $LiClO_4$, a solvent such as γ-butyrolactone and propylene carbonate, and an ultraviolet absorbing agent such as benzophenone and cyanoacrylate) is incorporated between these substrates 12 and 66. EC layer 80 (which comprises film 76 comprising an EC substance and electrolyte solution 78) is sealed by sealing agent 80. Clip electrode 84 is fit to a lower edge of transparent glass substrate 12 and is electrically connected to transparent electrode film 75. Clip electrode 86 is fit to an upper edge of transparent glass substrate 66 and is electrically connected to transparent electrode film 75. Mirror body 88 for automobile EC exterior mirror as shown in FIG. 8 has a configuration that the arrangement of EC substance film 76 and that of electrolyte solution 78 in configuration of FIG. 7 are replaced with each other. In this figure, the parts common to FIG. 7 represent the same numbers or symbols. Mirror body for automobile EC exterior mirror as shown in FIG. 9 is configured that EC layer 90 is composed of an EC solution. EC layer 90 is sealed by sealing material 92. In this figure, the parts common to FIGS. 7 and 8 represent the same numbers or symbols.

Figure 10:
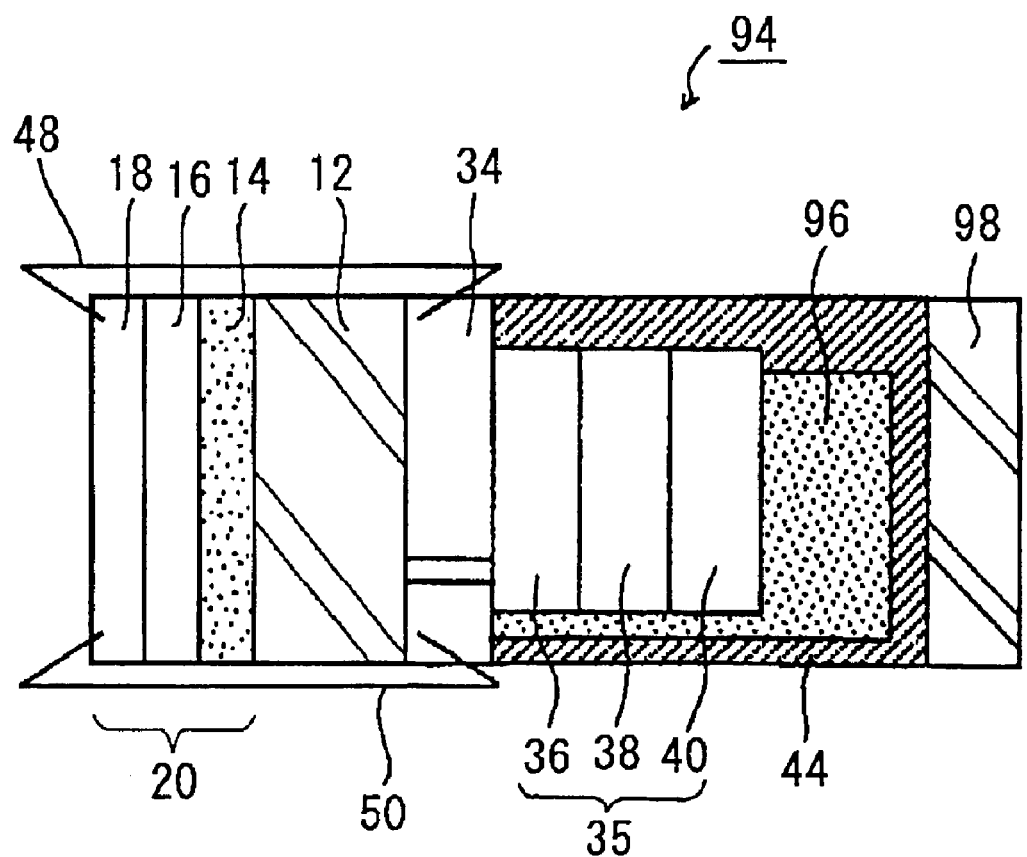
FIG. 10 is a schematic cross-sectional view showing an embodiment of an EC element, which is constituted to be totally transparent, utilizing the construction shown in FIG. 1.
Figure 11:
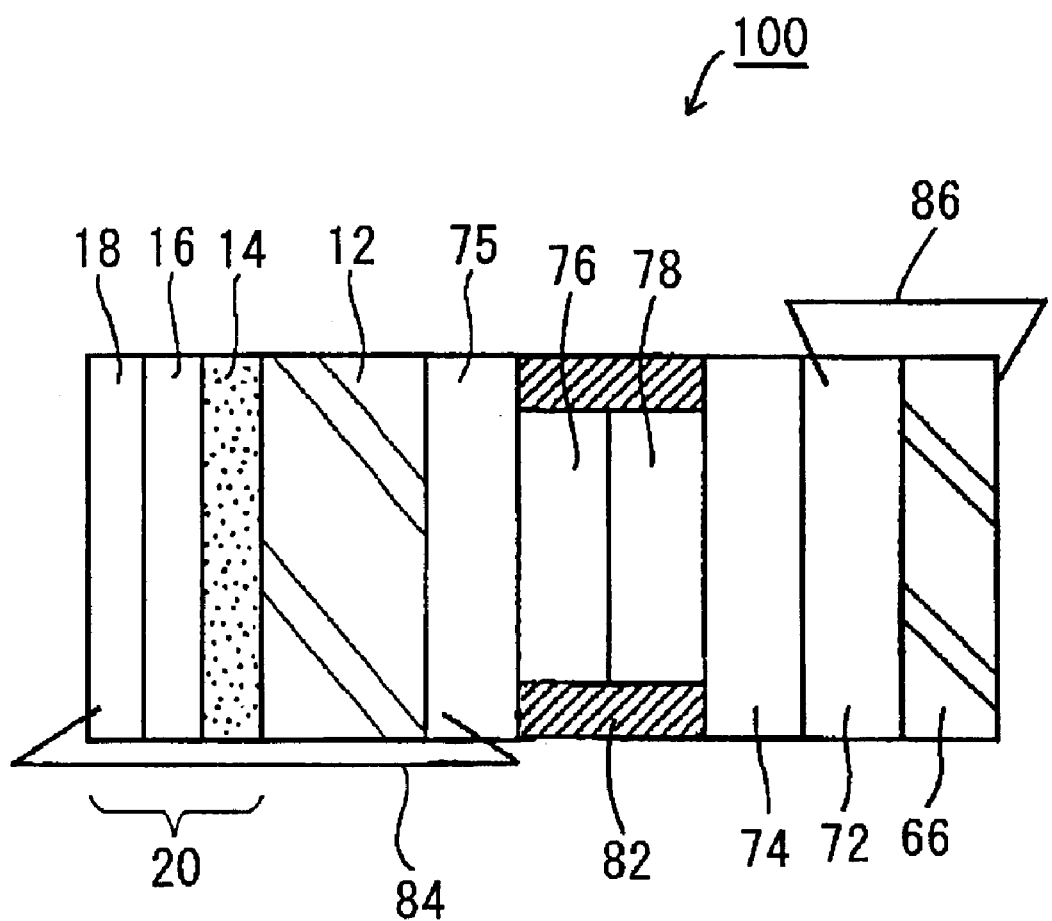
FIG. 11 is a schematic cross-sectional view showing another embodiment of an EC element, which is constituted to be totally transparent, utilizing the construction shown in FIG. 1.
Figure 12:
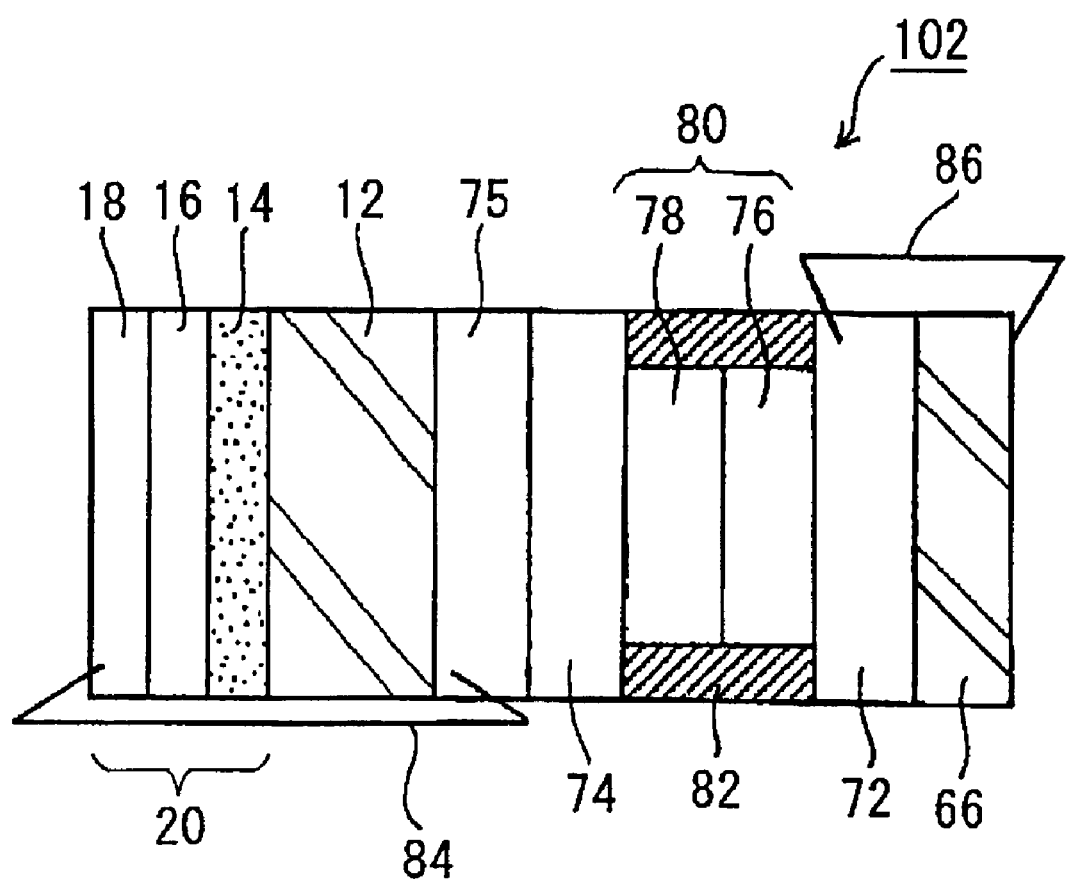
FIG. 12 is a schematic cross-sectional view showing still another embodiment of an EC element, which is constituted to be totally transparent, utilizing the construction shown in FIG. 1.
Figure 13:
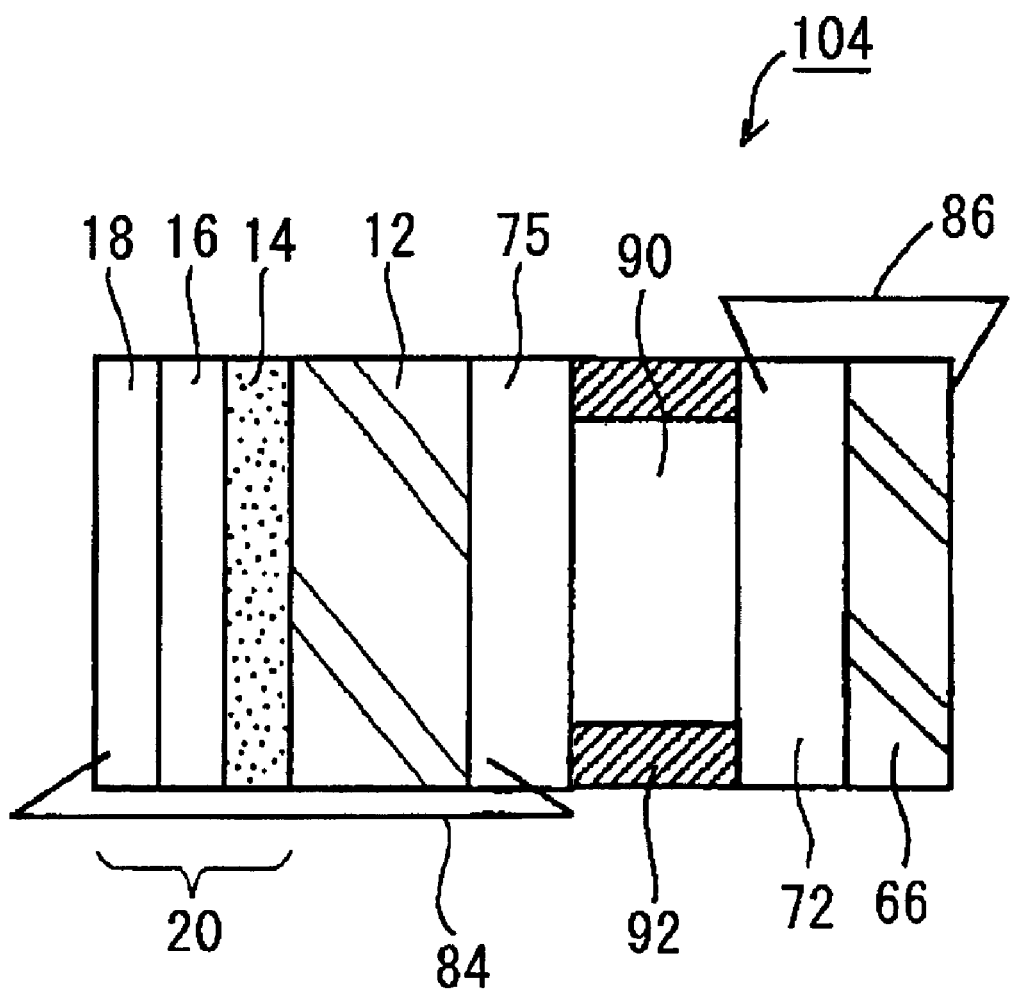
FIG. 13 is a schematic cross-sectional view showing still another embodiment of an EC element, which is constituted to be totally transparent, utilizing the construction shown in FIG. 1.

Embodiments of EC elements, entire area of which is transparent, utilizing the composite material according to the present invention will be shown in FIGS. 10 to 13. They can be used as light controlling windows, e.g., for constructions and automobiles. The same number or symbols will be applied to the parts, which are the same as those of the forgoing embodiments. EC element 94 as shown in FIG. 10 has a configuration of FIG. 5, except that transparent electrode 96 is placed instead of electrode/reflecting film 42 and glass substrate 98 comprises transparent glass substrate. EC element 100 as shown in FIG. 11 has a configuration of FIG. 7, from which reflecting film 68 and protective coating 69 are removed. EC element 102 as shown in FIG. 12 has a configuration of FIG. 8, from which reflecting film 68 and protective coating 69 are removed. EC element 104 as shown in FIG. 13 has a configuration of FIG. 9, from which reflecting film 68 and protective coating 69 are removed.

What is claimed is:

1. A composite material formed on a substrate, comprising:
   a primer layer provided on said substrate and comprising a double oxide comprising $Al_2O_3$ and one of $La_2O_3$ and $Pr_2O_3$; and
   a photocatalyst layer provided on said primer layer,
   wherein said primer layer is adjusted such that said primer layer has a refraction index between refraction indexes of said substrate and photocatalyst layer.

2. A composite material formed on a substrate, comprising:
   a primer layer provided on said substrate and comprising a double oxide comprising $Ta_2O_3$ and $Al_2O_3$; and
   a photocatalyst layer provided on said primer layer,
   wherein said primer layer is adjusted such that said primer layer has a refraction index between refraction indexes of said substrate and photocatalyst layer.

3. The composite material as claimed in claim 1, wherein said photocatalyst layer comprises $TiO_2$.

4. The composite material as claimed in claim 2, wherein said photocatalyst layer comprises $TiO_2$.

5. The composite material as claimed in claim 1, further comprising a hydrophilic layer laminated on said photocatalyst layer.

6. The composite material as claimed in claim 2, further comprising a hydrophilic layer laminated on said photocatalyst layer.

7. The composite material as claimed in claim 5, wherein said hydrophilic layer comprises porous $SiO_2$.

8. The composite material as claimed in claim 6, wherein said hydrophilic layer comprises porous $SiO_2$.

9. The composite material as claimed in claim 1, wherein said substrate comprises a glass.

10. The composite material as claimed in any one of claims 1 and 2, wherein said substrate comprises a transparent substrate, and said composite material is configured to be transparent throughout the front surface to the back surface.

11. The composite material as claimed in claim 10, further comprising a reflecting film formed on said transparent substrate to make up a mirror.

12. The composite material as claimed in any one of claims 1 and 2, further comprising a reflecting film formed between said substrate and said primer layer to make up a mirror.

13. The composite material as claimed in claim 12, wherein said primer layer makes up a layer for controlling reflectance characteristics, which controls the surface reflectance characteristics of the composite material.

14. The composite material as claimed in claim 10, further comprising a second substrate placed on the back surface side of the transparent substrate in an opposite manner, and a substance expressing an electroebromic phenomenon incorporated between these two substrates to make up an EC element.

15. The composite material as claimed in claim 14, wherein said second substrate is a transparent substrate, and a reflecting film is formed on the outer surface of said second substrate to make up an EC mirror.

16. The composite material as claimed in claim 14, further comprising an electrode/reflecting film formed on the inner surface of said second substrate to make up an EC mirror.

17. The composite material as claimed in claim 11, which is constituted as a mirror body for automobile exterior mirror.

18. The composite material as claimed in claim 12, which is constituted as a mirror body for automobile exterior mirror.

19. The composite material as claimed in claim 13, which is constituted as a mirror body for automobile exterior mirror.

20. The composite material as claimed in claim 15, which is constituted as a mirror body for automobile exterior mirror.

21. The composite material as claimed in claim 16, which is constituted as a mirror body for automobile exterior mirror.

22. The composite material as claimed in claim 2, wherein said substrate comprises a glass.

* * * * *